US006765569B2

(12) United States Patent
Neumann et al.

(10) Patent No.: US 6,765,569 B2
(45) Date of Patent: Jul. 20, 2004

(54) AUGMENTED-REALITY TOOL EMPLOYING SCENE-FEATURE AUTOCALIBRATION DURING CAMERA MOTION

(75) Inventors: Ulrich Neumann, Manhattan Beach, CA (US); Suya You, Arcadia, CA (US)

(73) Assignee: University of Southern California, Los Angeles, CA (US)

( * ) Notice: Subject to any disclaimer, the term of this patent is extended or adjusted under 35 U.S.C. 154(b) by 300 days.

(21) Appl. No.: 09/963,850

(22) Filed: Sep. 25, 2001

(65) Prior Publication Data

US 2002/0191862 A1 Dec. 19, 2002

Related U.S. Application Data

(60) Provisional application No. 60/274,001, filed on Mar. 7, 2001.

(51) Int. Cl.[7] .............................................. G06T 15/00

(52) U.S. Cl. ....................... 345/419; 345/629; 345/632; 345/633; 382/103; 382/154; 348/169

(58) Field of Search ................................ 345/419, 629, 345/632, 633, 427.3, 427; 382/103, 154; 348/169

(56) References Cited

U.S. PATENT DOCUMENTS 5,815,411 A 9/1998 Ellenby et al.
6,064,749 A * 5/2000 Hirota et al. ................ 382/103
6,500,008 B1 * 12/2002 Ebersole et al. ............ 434/226

OTHER PUBLICATIONS

Ulrich Neumann, "Tracking for Object–Centric Augmented Reality," pp. 1–14, University of Southern California, Mar., 1998.

Ulrich Neumann and Jun Park, "Extendible Object–Centric Tracking for Augmented Reality," pp. 1–10, University of Southern California, Mar., 1998.

Jun Park et al., "Natural Feature Tracking for Extendible Robust Augmented Realities," pp. 1–9, University of Southern California, Aug. 1998.

Ulrich Neumann and Jun Park, "Tracking for Augmented Reality on Wearable Computers," pp. 1–27, University of Southern California, 1998.

Jun Park et al, "Extending Augmented Reality with Natural Feature Tracking," pp. 1–10, University of Southern California, Nov. 4, 1998.

Bolan Jiang et al., "Camera Tracking for Augmented Reality Media," pp. 1–4, University of Southern California, Jul. 30, 2000.

Ulrich Neumann and Suya You, "Natural Feature Tracking for Augmented–Reality", pp. 0–34, University of Southern California, Mar., 1999.

Ulrich Neumann et al., "Augmented Reality Tracking in Natural Environments," pp. 1–30, University of Southern California, Mar., 1999.

Jun Park et al., "Vision–based Pose Computation: Robust and Accurate Augmented Reality Tracking," pp. 1–10, University of Southern California, Oct., 1999.

* cited by examiner

*Primary Examiner*—Mark Zimmerman
*Assistant Examiner*—Kimbinh T. Nguyen
(74) *Attorney, Agent, or Firm*—McDermott, Will & Emery

(57) ABSTRACT

An augmented reality tool makes use of autocalibrated features for rendering annotations into images of a scene as a camera moves about relative to the scene. The autocalibrated features are used for positioning the annotations and for recovery of tracking, correspondences and camera pose. An improved method of autocalibration for autocalibrating structured sets of point features together is also described. The augmented reality tool makes use of manual, semi-automatic and automatic methods employing autocalibrated features.

52 Claims, 8 Drawing Sheets

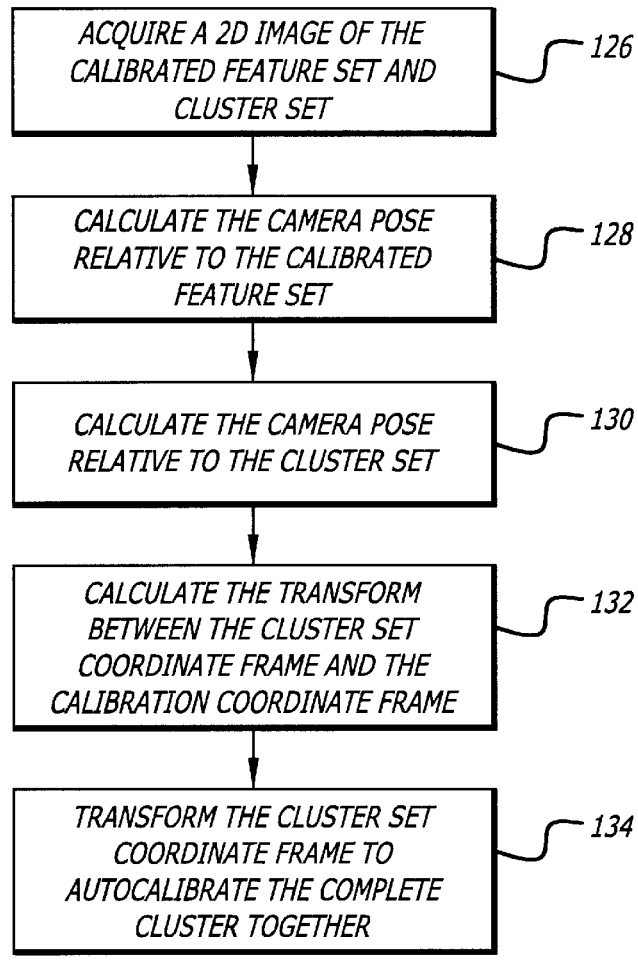
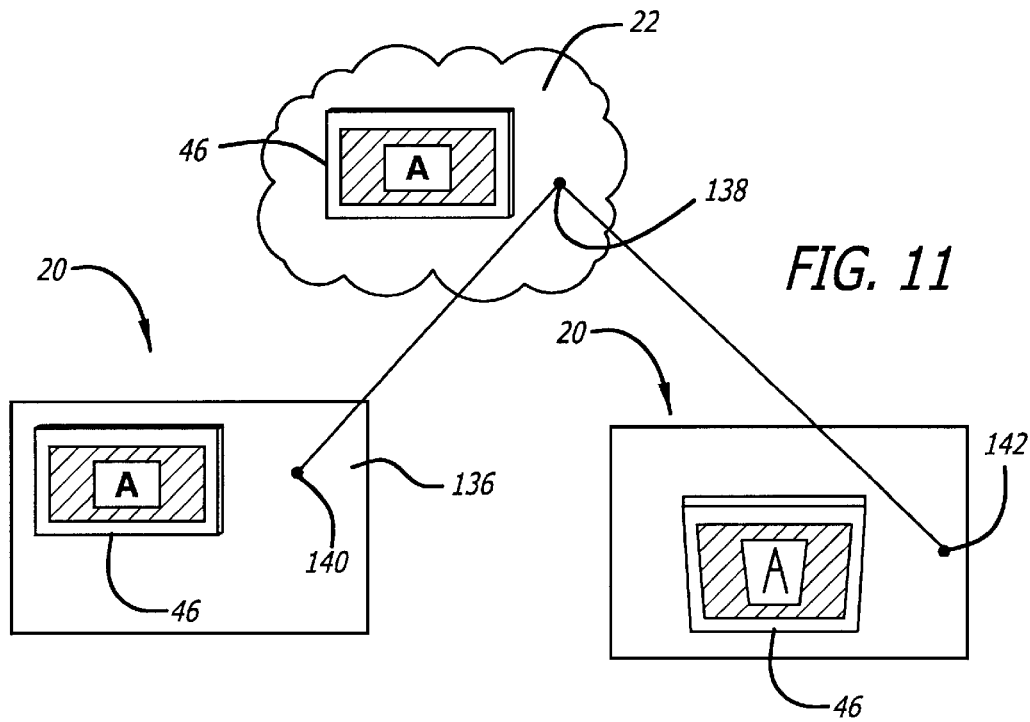

AUGMENTED-REALITY TOOL EMPLOYING SCENE-FEATURE AUTOCALIBRATION DURING CAMERA MOTION

The present invention claims the benefit of U.S. Provisional Application No 60/274,001, filed Mar. 7, 2001.

This invention was made with the support of the United States Government under Grant No. N00019-98-BAA-UATD, awarded by the Department of Defense (DARPA). The Government has certain rights in this invention under 35 U.S.C. §202.

BACKGROUND OF THE INVENTION

1. Field of the Invention

The present invention relates to a tool and method for producing an augmented image by combining computer-generated virtual-images with a real-world view, and more particularly to a tool and method for using the autocalibration of scene features to produce the augmented image.

2. General Background and State of the Art

An Augmented Reality (AR) is a view of the world that contains a mixture of real and computer-generated (CG) objects. Computer generated objects can include text, images, video, 3-dimensional models, or animations. Augmented reality is distinguished from simple overlays by the fact that the combined real and computer generated objects are observed and behave as if they were in some defined spatial relationship to each other. For example, an augmented reality scene may contain a computer generated picture on a real wall, or a real picture that appears to be hanging on a virtual wall. In some cases the real world may be completely occluded by the computer generated objects and in others, the computer generated objects may not be visible in a particular view of the real-world view.

As the viewing position and orientation (also known as view pose) changes, the real and computer generated objects shift together to preserve the viewer's sense that their spatial relationships are maintained. For example, a computer generated cup positioned to appear on a real table-top will maintain the appearance of being on the table from as many viewing directions and positions as possible. To maintain the real and computer generated object relationships as the viewing pose changes, the computer generated system must have information about the view pose to produce an appropriate view of the computer generated object to merge with the real world. The process whereby this view pose information is obtained is known as Pose Tracking (PT).

Pose tracking is performed with measurement systems using a variety of sensors and signals including ultrasound, optical beacons, or inertial technologies. Relevant to this patent application are the methods using images from still or video cameras to determine viewing pose. Many approaches are known for computing where a camera must be (i.e., its pose) given a particular image or series of images.

Pose tracking with cameras often relies on the detection and tracking of features and their correspondences to calibrated positions or coordinates. These terms are further defined below:

Features are any identifiable parts of a scene that can be located in one or more images. Examples include points, corners, edges, lines, and curves. Regions with numerous intensity variations are called texture regions. Examples of texture regions include a text character, lines of text on a page, foliage on trees, a photograph on a wall.

Feature detection is performed by a computer analysis of an image. The detection process searches for a particular type of feature or texture region and computes its 2D coordinates within the image.

Features are tracked between images by computer analysis of two images containing the same features. For example, as a camera pans to the right, the features in the first image appear shifted to the left in the second image. Feature tracking computes that change in the 2D position of a feature from one image to the next. Tracking matches or corresponds the features in one image to another image.

Correspondences identify matching image features or their coordinates. There are two often-used forms of correspondences. 2D correspondences identify the same features detected in two or more images. 3D correspondences identify an image feature and its known 3D coordinates. Features with 3D correspondences are called calibrated features.

Features can also be corresponded by recognizing their association with color, shape, or texture regions. For example, consider a series of images showing a single blue dot among many red dots on a white wall. In any image, the detected blue dot feature can be corresponded to the same blue dot appearing in another image (2D correspondence) because of its unique color. In any image the detected blue dot can also be corresponded to its known 3D coordinate (3D correspondence) because of its unique color. Just as color can distinguish between otherwise similar features, shape or texture regions can distinguish otherwise similar features. For example, a blue triangle can be distinguished from blue dots. In another example, a blue dot with a letter "T" in it is distinguishable from a blue dot with a letter "W". Some features have recognizable attributes. Some augmented reality tools have recognition capabilities.

Camera pose (position and orientation) can be computed when three or more calibrated features in an image are detected. Given the camera pose, computer generated objects can be mixed into the scene image observed by the user to create an augmented reality.

An augmented reality can be presented to an observer through an optical mixing of real and computer generated images or a mixing of real scene video with computer generated video. The augmented reality images may be still or moving images. Augmented reality images can be produced in real-time while a user is physically viewing a scene, augmented reality images can also be produced off-line from recorded images.

Prior art by the inventors of the present invention discloses the use of autocalibration for producing augmented reality images. The autocalibration method is used to increase the number of calibrated features in the scene from which to compute camera pose. Generally, with more calibrated features visible in an image, more reliable and accurate camera poses are computed. As the augmented reality system is used, autocalibration produces more and more calibrated features from which to compute pose.

Autocalibration is accomplished using natural features (NF) or intentional fiducials (IF) within the scenes being viewed by the camera. The natural feature and intentional fiducial are detected as points with 2D image positions. Autocalibration can be accomplished as the camera moves as follows:

1) Initially, the scene must contain at least three calibrated natural features or intentional fiducials. Remaining natural features and intentional fiducial are uncalibrated.
2) A user begins an augmented reality session by pointing the camera at the calibrated natural features or intentional fiducials, enabling the system to compute the camera pose.

3) The user moves the camera around, always keeping the calibrated natural features or intentional fiducials in view. Autocalibration occurs during this and subsequent camera motions. As the camera moves, the system computes camera pose from the calibrated features and detects and tracks uncalibrated natural features and/or intentional fiducial from different camera positions. Each view of a tracked natural feature or intentional fiducial contributes to an improved estimate of the feature's 3D position.

4) Once a natural feature or intentional fiducial position estimate is known to an acceptable tolerance it becomes an autocalibrated feature (AF) and it is useable as an additional calibrated feature for estimating camera poses.

Autocalibration can be computed during on-line real-time augmented reality system use, or it can be computed during off-line video processing. The intent of autocalibration is to increase the number of calibrated features for tracking. This purpose does not rely upon any particular mathematical method of autocalibration. The prior art by the inventors of the present invention describes the use of several variants of Extended Kalman Filters for performing autocalibration. Other methods, such as shape from motion, are suitable as well. The end result of any method of autocalibration is an increased number of calibrated features in the scene to support pose tracking.

Autocalibration is computed by processing data from a start time forward for either on-line or off-line cases. Batch methods of autocalibration process data in time-forward and time-reverse order, but these methods are best suited to off-line video processing. Autocalibration can be done with any imaging system including nonplanar panoramic or panospheric projections.

In the prior art augmented reality devices, autocalibration has been used to sense and integrate new features into its calibration database for camera pose tracking. However, the prior art has not made full use of autocalibrated features and many problems have remained in the incorporation of autocalibration into a practical augmented reality system or tool. For example, the prior art has not used autocalibrated features for aligning models to the calibration coordinate system.

Also, during autocalibration, loss of 2D tracking, 3D correspondences, and camera pose tracking are common due to rapid motions, camera occlusions, or poor imaging conditions. Given an augmented reality tool without autocalibration, as the user moves the camera around the office, if calibrated features move out of view, pose tracking is lost. The user must redirect the camera towards the calibrated features for the augmented reality tool to recover pose tracking and produce annotations. Additionally, all objects in the scene that are to be annotated need 3 or more calibrated features near them. In practice, this is burdensome on the user and an impractical constraint upon the scene. Autocalibration was developed to overcome this hurdle. Given an augmented reality tool with autocalibration, as the user moves the camera to capture the scene, new features are detected and autocalibrated. These autocalibrated features are used by the augmented reality tool for pose estimation as described in the prior art. However, in the prior art, if the camera motions or viewing conditions cause autocalibration to fail or produce erroneous poses, both pose tracking and the accumulated set of autocalibrated features are lost. Pose tracking can only be recovered by repeating the initialization process. With the re-initialization for pose tracking, autocalibration must also restart since all 2D and 3D correspondences are lost for the accumulated set of autocalibrated features. The accumulated set of autocalibrated features are of no use and discarded, a new and likely different set of autocalibrated features must be rebuilt from scratch. The prior art has not used autocalibrated features for the subsequent recovery of 2D tracking, 3D correspondences, and camera pose.

Additionally, autocalibration by itself does not provide any mechanism for the recovery and reuse of 3D correspondences once features leave the screen or 2D correspondences are lost. In the prior art, pose tracking depends on both the detection of three or more features in the image and their 3D correspondences (if they exist). Both are prone to failure during typical use of an augmented reality tool. Even during optimal conditions, prior art descriptions of autocalibration only use the autocalibrated feature while they are on screen. For example, if a door corner enters the image as the augmented reality tool camera moves, it is autocalibrated and then used to compute pose as long as it remains in view. Once the camera moves beyond the door, all use of that door corner information is currently lost. Even if the camera returns to the door area, the detection and autocalibration of that same corner feature is repeated.

Also, even when autocalibrating structured sets of point features, the prior art autocalibration methods calibrate the points separately. This prior art method of autocalibrating structured sets of points is inefficient and fails to maintain the relative point relationships within the structured set.

INVENTION SUMMARY

A general object of the present invention is to extend the uses of autocalibration, beyond the camera pose tracking described in the prior art, to improve the reliability and efficiency of augmented reality systems. A more specific objective is to use autocalibrated features for aligning models to the calibration coordinate system. Another objective is to use autocalibrated features for recovery of 2D tracking, 3D correspondences, and camera pose. Another specific objective is to autocalibrate structured sets of point features together.

BRIEF DESCRIPTION OF THE DRAWINGS

FIG. 10 also shows the method for autocalibrating clusters of features or shape features as a group.

FIG. 11 shows a semi-automatic method for rendering annotations into the scene.

DETAILED DESCRIPTION OF THE PREFERRED EMBODIMENTS

While the specification describes particular embodiments of the present invention, those of ordinary skill can devise variations of the present invention without departing from the inventive concept.

The present invention provides a system and tool for producing mixed or augmented reality images. These images combine computer-generated objects or data with images of a real scene for the purpose of informing, entertaining, or otherwise modifying a user's view of the world. The invention incorporates methods for using information obtained by autocalibration. By using these methods, an augmented reality tool provides additional functions, more information, and simpler user interactions, beyond those possible without the invention.

The present invention provides a system and tool for producing mixed or augmented reality images. These images combine computer-generated objects or data with images of a real scene for the purpose of informing, entertaining, or otherwise modifying a user's view of the world. The invention incorporates methods for using information obtained by autocalibration. By using these methods, an augmented reality tool provides additional functions, more information, and simpler user interactions, beyond those possible without the invention.

Figure 1:
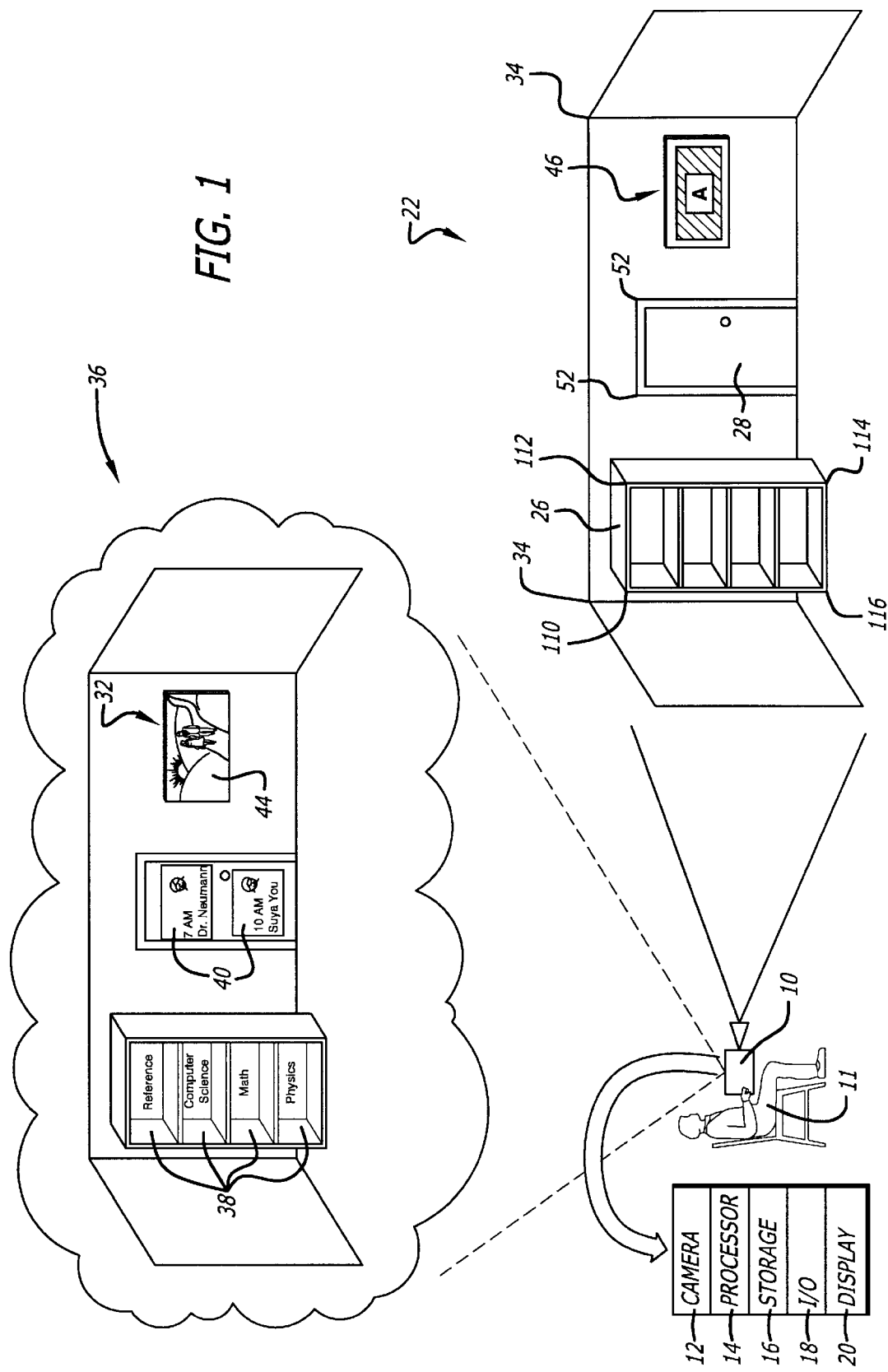
FIG. 1 shows a scene captured by an augmented reality tool and annotations rendered into an image of the scene

FIG. 1 shows a hand-held augmented reality tool 10 in a business office setting. The tool 10 comprises a camera 12, a processor 14, storage and/or memory medium 16, input/output devices 18, and a display 20. The tool 10 is shown held by a user 11. The tool 10 can have a compact form resembling a Personal Data Assistant (PDA). Alternatively, the camera 12 and/or display 20 can be head-worn or body-mounted (e.g., wrist-worn) for hands-free operation. In certain embodiments, a heads-up display can be used for viewing the augmented scene.

The tool 10 can be enclosed in a single housing or can be divided among several separate housings. Alternatively, the tool 10 can be strictly an image acquisition device and the images can be transferred to a separate device for processing. When using a physically separate processing device, the image can be transferred to the separate device in real time or at a later time for batch processing.

The camera 12 can be a known image acquisition device such as a camcorder or digital camera. An analog to digital (A/D) converter can be used to convert analog images into digital data for processing by the processor 14 as is known in the art.

The tool 10 is shown capturing views of an office scene 22. The views of the scene are recorded into the medium 16 of the tool 10. The medium 16 can be a memory chip, hard drive, frame memory, film or video tape, for example, and can be attached to the tool 10 or located remotely.

The augmented reality tool 10 is used to provide computer generated electronic information, or annotations, modifying the office scene 22. The office scene 22 includes a bookcase 26 and a door 28. An augmented image 36 shows a view of the scene 22 combined with the electronic modifications for display by the display 20. The modifications to the scene 22 producing the image 36 include a directory 38 overlaid on the bookcase 26 showing the various topics associated with each shelf. Also included are text and images 40 on the door related to the people expected to arrive for appointments. A virtual TV 32 is positioned on a wall and displays any type of visual material 44, for example a movie or television program provided through the tool 10. The electronic information is displayed on the images of these objects in some fixed 2D or 3D relationship. For example, regardless of the view of the bookcase 26, on the augmented reality tool display 20, the information related to the bookcase 26 will appear in a fixed relation to its image.

In order to use the augmented reality tool 10, a set of calibrated, or reference, features should exist in the office. The calibrated features are either intentional fiducials (IF) or selected natural features (NF) positioned in the room so that they are easily visible to the augmented reality tool 10. At least three recognizable calibrated features are needed for calibrating the scene. Selected natural features are objects naturally occurring in the scene which have had their coordinates or positions calibrated. Intentional features are intentionally designed to include easily detectable features for placement in the scene. An intentional fiducial 46 is shown hanging on the wall. The intentional fiducial 46 is composed of a shaded square-shaped region printed on a portion of a piece of plain backing material. Three or four of the corners of the shaded region can serve as calibrated features since their relative positions are known. Within the shaded region is an identification symbol or texture region for identifying and distinguishing between different intentional fiducials which might all be placed within the scene 22. Note that in the augmented image 36, displayed on the display 20, the intentional fiducial 46 is obscured from view by the superimposed virtual TV 32. Examples of natural features illustrated in FIG. 1 include room corners 34 where two walls meet the ceiling, and door-frame corners 52.

Figure 5:
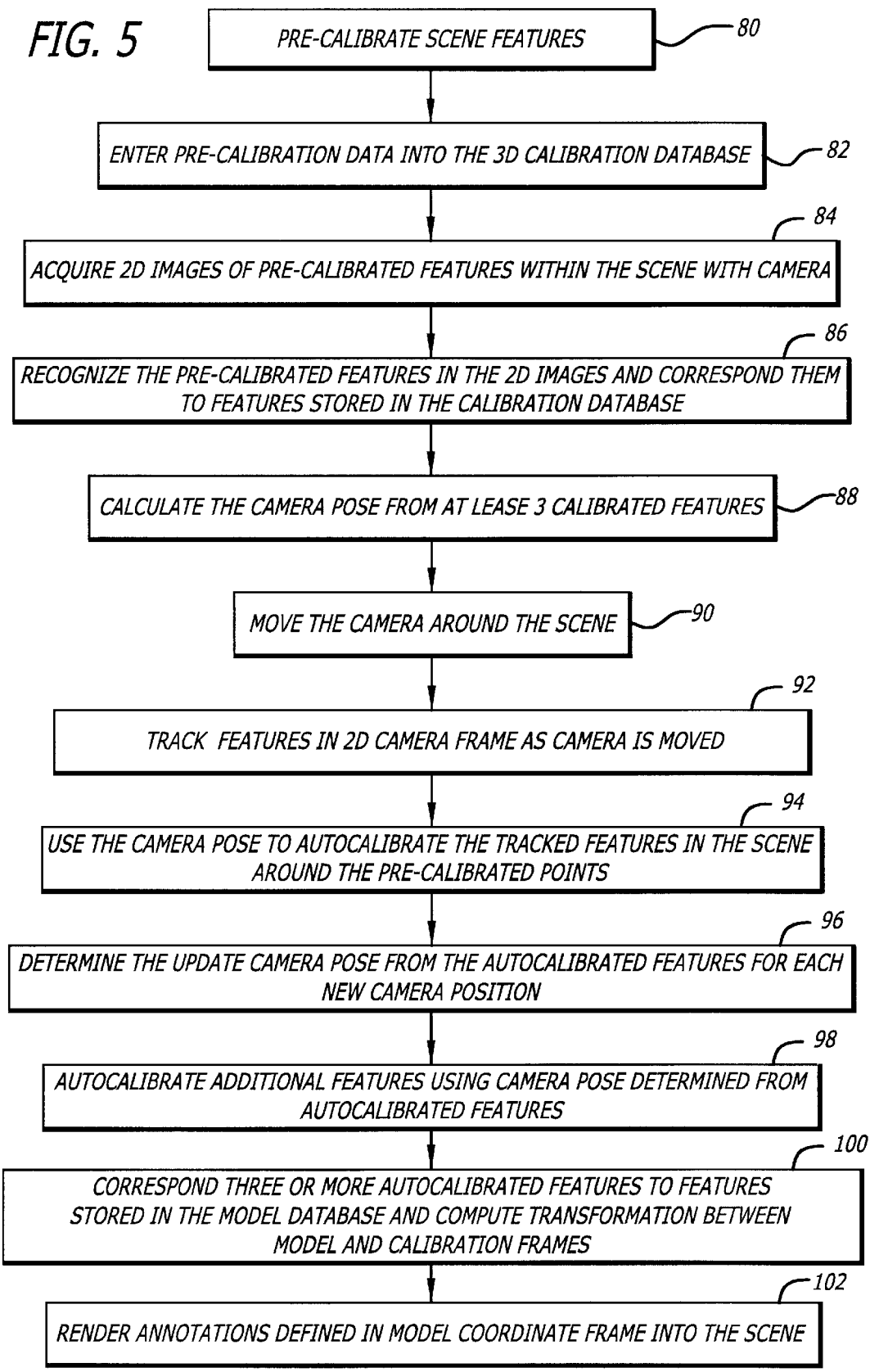
FIG. 5 shows the method for using autocalibrated features to determine the transformation between the model coordinate frame and calibration coordinate frame.

The measurements and other characteristics of the intentional fiducials or natural features are stored during a pre-calibration step 80 as illustrated in FIG. 5. The intentional fiducials can be printed so that their measurements and characteristics are known to a high degree of precision by design. In order to pre-calibrate natural features, a measurement device or system, for example a ruler or tape measure, is used to measure the natural features' positions. In the scene 22, the positions and characteristics of the room corners 34 and door-frame corners 52 can be measured in the pre-calibration step so that they can serve as natural features. The positions of the room corners 34 and the door-frame corners 52 can also be obtained from blueprints of the room, for example.

Objects less fixed in space than the room corners and door-frame, such as the bookcase 26, can also serve as calibrated natural features so long as they are not moved during the augmented reality session. All that is needed is that the measurements and characteristics of three or more calibrated points from these objects are known or measured and input into the calibration database prior to the start of the augmented reality session. The calibrated features should occupy a relatively small volume, thereby simplifying their construction and measurement.

Figure 2:
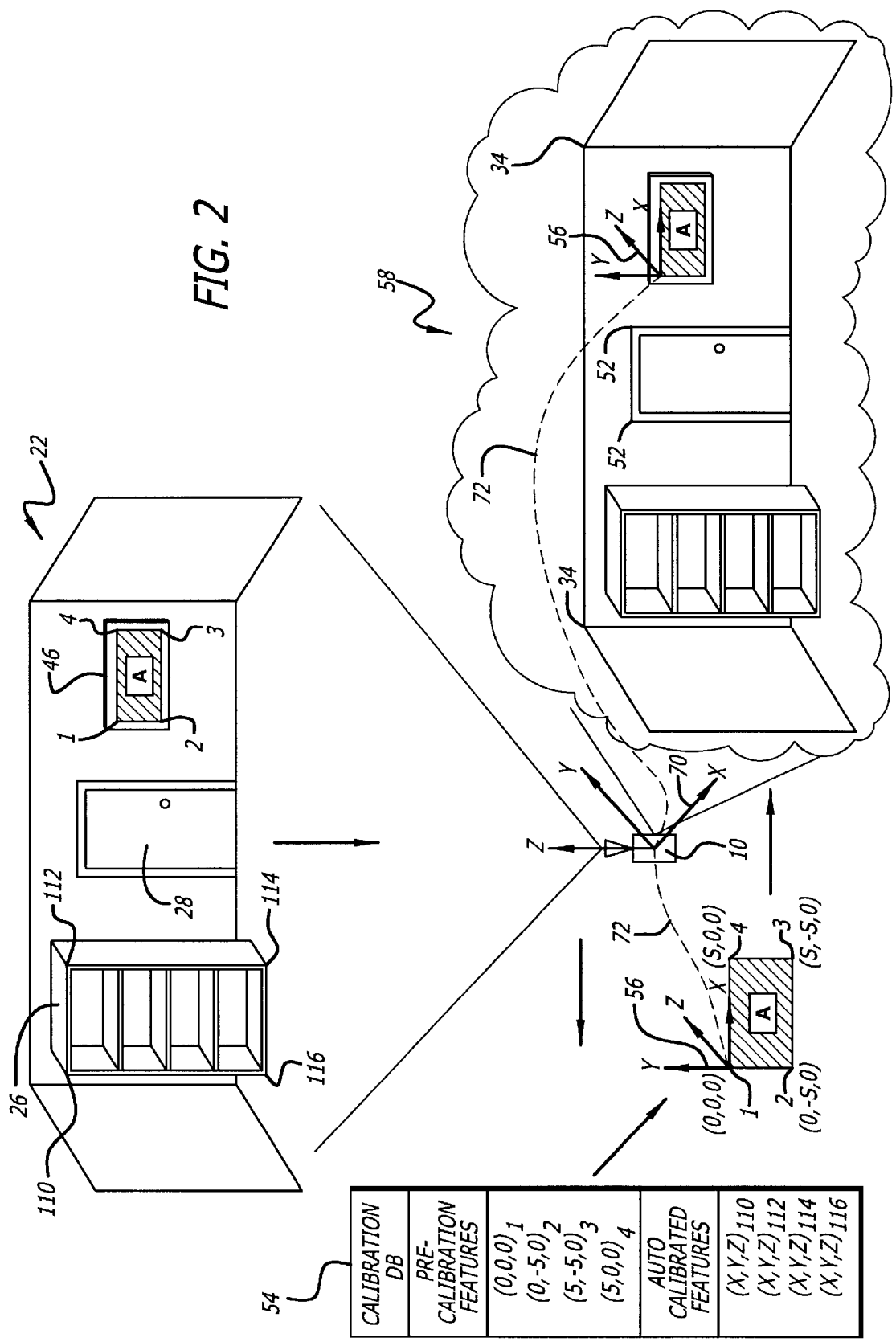
FIG. 2 shows camera pose determined from an intentional fiducial recognized and corresponded with 3D points in a calibration database.

As illustrated in FIG. 2 and at step 82 of FIG. 5, the augmented reality tool 10 stores the three dimensional coordinates for the calibrated features in a calibration database 54 relative to a calibration or reference frame 56. The calibration frame 56 provides the origin and axes of the calibrated feature coordinates. The calibration database 54 can be created by storing measurements for at least three features of the intentional fiducials or natural features into the database 54 along with recognizable characteristics of the intentional fiducials or natural features such as geometric configurations of points, corners, edges, lines, and curves, or characteristics such as intensity or color variations. In particular, FIG. 2 shows a portion of the calibration database 54 containing (X, Y, Z) coordinate information for each of four outer corners 1, 2, 3, 4 of the intentional fiducial 46. One feature, for example the corner 1, is selected as the origin and orthogonal directions (two in the surface plane) are chosen as the calibration frame. Of course other positions and orientations of the intentional fiducial 46 relative to the calibration frame 56 can be used.

At the start of the augmented reality session, the camera 12 is directed towards the calibrated features of the intentional fiducials or natural features so that three or more are in view. The augmented reality tool 10 then acquires 2D images of the scene 22 which then becomes visible on the augmented reality tool display 20 as shown at step 84 of FIG. 5. The augmented reality tool 10 views the 2D scene 22 in a camera coordinate frame 70 illustrated in FIG. 2. The processor 14 automatically, or with manual assistance, detects and corresponds the calibrated features in the 2D images to 3D coordinates stored in the calibration database 54 as shown at step 86 of FIG. 5. Methods for automatically making these correspondences are based on recognizing the features' attributes such as geometric configurations of points, corners, edges, lines, and curves, or using intensity or color variations stored in the calibration database 54. Manual selection of features can also be used. For example, the door-frame corners 52 and room corners 34 can be selected in an image by a pointing device (e.g., a mouse) to correspond them to their known 3D coordinates in the calibration database 54. The augmented reality tool 10 can prompt the user to find a particular calibrated feature within the scene 22 and select it with a pointing device. The intentional fiducial 46 can also be selected using a pointing device followed by automatic correspondence of the 2D image of the corners to the coordinates of the corners stored in the calibration database 54.

FIG. 2 shows the intentional fiducial 46 of the scene 22 successfully corresponded to the corresponding intentional fiducial 46 features in the calibration database 54. Once three or more points are corresponded between the calibration database 54 and the scene 22, the camera coordinate frame 70 can be determined relative to the calibration frame 56. The intentional fiducial 46 is shown with corners 1, 2, 3, 4 positioned relative to the calibration frame 56 at (0, 0, 0), (S, 0, 0), (S, −S, 0), (0, −S, 0), respectively, where the intentional fiducial 46 has the dimensions of an S×S square. The camera pose observing the scene 22 is thus known relative to the calibration frame 56 as illustrated by image 58.

Once the coordinates of at least three calibrated features are known in both the camera frame 70 and the calibration frame 56 the augmented reality tool 10 can compute the instantaneous camera pose as shown at step 88 of FIG. 5. The camera pose is expressed in terms of a camera pose matrix 72 as follows:

$$\chi_P = \begin{bmatrix} x_1 & x_2 & x_3 & x_4 \\ x_5 & x_6 & x_7 & x_8 \\ x_9 & x_{10} & x_{11} & x_{12} \end{bmatrix}.$$

The camera pose matrix 72 expresses how the camera is positioned in the calibration frame 56 by representing the camera's position and rotation. The elements $x_1$, $x_2$, $x_3$, $x_5$, $x_6$, $x_7$, $x_9$, $x_{10}$, $x_{11}$ define rotation and the elements $x_4$, $x_8$, $x_{12}$ define translation. The camera pose matrix provides the transform between the camera coordinate frame 70 and the calibration frame 56.

Figure 3:
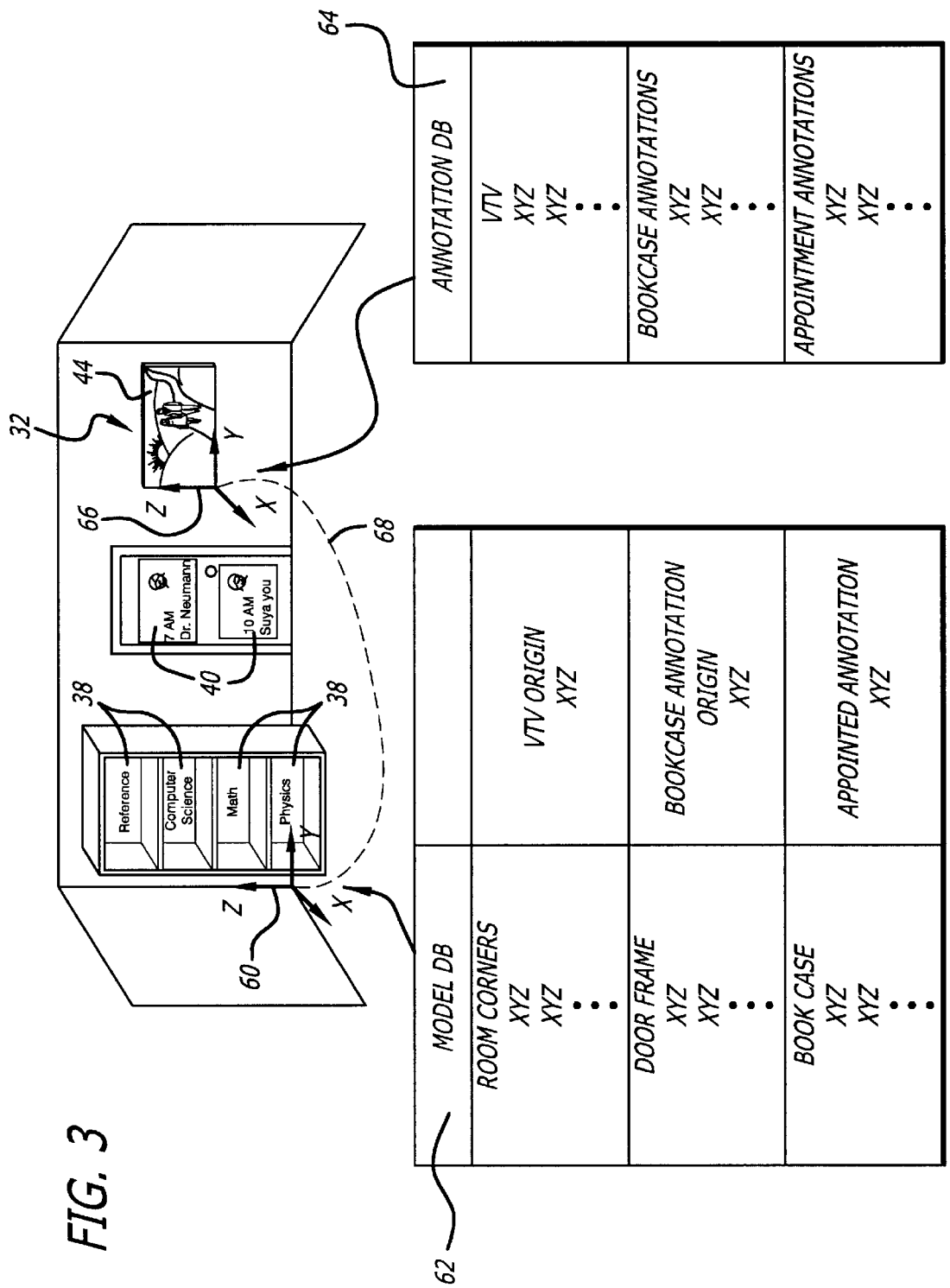
FIG. 3 shows the relationship between the model database and model coordinate frame to the annotation database and annotation coordinate frame.

The 3D coordinates of the desired computer generated electronic information, or annotations, in the office should also be known. In our example, we assume the positions of the virtual television 32 and the annotations 38 on the bookcase 26 and annotations 40 on the door 28 are known relative to an origin and axes referred to as the model coordinate frame 60. This coordinate information is stored in a model database (MDB) 62 and it includes the annotation positions and it may contain additional information such as complete component models of the furniture and objects in the office or surrounding area and models for the annotations themselves. The model database 62 of FIG. 3 is shown to contain 3D component models consisting of coordinates for points of various room features and objects, including the room corners 34, the door frame corners 52 and the bookcase 26. Additionally, the model database 62 is shown to contain annotation origin positions for the virtual television (VTV) 32 and annotation origin positions for the annotations 38, 40 to be matched to the bookcase 26 and the door 28, respectively. The 3D component models in the model database 62 can be used for determining the model coordinate frame 60 relative to the calibration frame 56 when both frames are defined relative to the same points.

At a minimum, the model database 62 should contain the annotation positions or origins. If the model coordinate frame 60 and the calibration coordinate frame 56 are the same, or if the transformation between the frames is known, then the annotations can be rendered directly into the calibration coordinate frame 56 as soon as the camera pose is known relative to the calibration coordinate frame 56. If the model coordinate frame 60 and the calibration coordinate frame 56 are different, then the model database 62 should, in addition to the annotation positions, contain three or more object points common to both the model database 62 and the scene 22 that can be used to determine the model coordinate frame 60 relative to the calibration coordinate frame 56. In other words, the model database 62 should include the annotation positions as well as some detectable object features. These features can be included in the model database 62 in advance of the augmented reality operation. For example, measurements of the bookcase 26 can be acquired in advance and a component model created. The positions of the bookcase model and the annotations 38 for superposition with the bookcase model are then defined relative to the 3D model coordinate frame 60, and stored in the model database 62.

Rather than the model database 62 containing both the annotation positions and the annotations themselves, a separate annotation database 64 (as illustrated in FIG. 3) can include the annotations. The annotations have coordinate origins and axes called the annotation frame 66. The annotations can share common annotation frames 66 or have separate annotation frames 66. The annotation frames 66 are positioned at the annotation positions of the model database 62. If the annotation frames 66 are the same as the model frame 60 and the calibration frame 56, or if the transformations are known, then the annotations can be directly rendered into the scene 22. In FIG. 3, the virtual television 32 is shown having an annotation frame 66 positioned relative to the model frame 60. The transform between the annotation frame 66 and the model frame 60 is illustrated diagrammatically at 68.

The augmented reality tool 10 may also compose the annotations themselves on the fly based on incoming information rather than retrieving the annotation from a database such as the annotation database 64. For example, if the annotation is text describing a length measurement for an object in the room, the particular text of the annotation can be composed during the augmented reality session based on lengths determined from selected autocalibrated points. Similarly, the appointment annotations can be composed during the augmented reality session based on data acquired from an appointment computer program.

Once the camera pose is known relative to the calibration frame, the augmented reality tool 10 can begin autocalibration of uncalibrated natural features or intentional fiducials surrounding the calibrated intentional fiducial 46 or pre-calibrated natural features 34, 52 in the scene 22, as shown at steps 90–94 of FIG. 5. Autocalibration calibrates uncalibrated features by computing the 3D calibration frame coordinates from two or more 2D images acquired by the camera 12 and from the camera pose matrixes. Features are transformed from the camera coordinate frame 70 to the calibration coordinate frame 56 of FIG. 2 using the relationship:

$$[XYZ]_{Calibration} = X_P \begin{bmatrix} X \\ Y \\ Z \\ 1 \end{bmatrix}_{Camera}.$$

The camera coordinates $[X\ Y\ Z\ 1]_{Camera}$ are relative to the camera coordinate frame 70, the calibration coordinates $[X\ Y\ Z]_{Calibration}$ are relative to the calibration coordinate frame 56, and $X_P$ is the camera pose matrix 72 for transforming coordinates from the camera coordinate frame 70 to the calibration coordinate frame 56, as described above. Thus, after the camera pose matrix has been determined based on the intentional fiducial 46 or natural features 34, 52, the coordinates of the camera or the origin of the camera coordinate frame 70 are known in the calibration coordinate frame 56.

Autocalibration can occur by moving the camera about, changing the camera pose and view, while keeping a pre-calibrated feature set within the camera's view as shown in step 90 of FIG. 5. The pre-calibrated features are kept in view as the camera is moved about and the augmented reality tool computes an updated camera pose matrix for the given camera image. As the camera moves about, the features are tracked in the two-dimensional camera frame 70 as shown at step 92 of FIG. 5. The display may prompt the user to move and rotate the camera in certain ways to facilitate autocalibration. The augmented reality tool may also provide screen information about the progress of auto-calibration. As the camera is moved about, the calibration frame coordinates of tracked features are estimated from a series of images and updated camera poses. As the camera views each feature from different angles, the accuracy of the position estimates of features improves until the accuracy is within an acceptable tolerance level and the features are considered autocalibrated as shown at step 94 of FIG. 5. The camera is gradually moved to view parts of the scene 22 further from the original pre-calibrated features which may be lost from view. Further camera pose matrices are computed and additional features are autocalibrated using the autocalibrated features rather than pre-calibrated features as shown in steps 96, 98 of FIG. 5. The 3D coordinates and recognizable characteristics of the autocalibrated features can be stored in the calibration database 54, as shown in FIG. 2, or in a separate autocalibration database. The calibration database 54 can comprise several separate databases, one of which is an autocalibrated feature database. The 3D coordinates and recognizable characteristics of the autocalibrated features can remain stored in the calibration database 54, or in the separate autocalibrated features database, even after the stored autocalibrated features are no longer within the camera's view. This stored autocalibrated data is useful in camera pose tracking recovery as described later.

Augmented reality systems commonly assume the calibration frame and model frame are the same. Even when they are not, their transformations are usually pre-calibrated off-line before the augmented reality session begins. In the prior art, pre-calibration of the features is costly and time consuming. Typically, pre-calibration has been done using some measurement device, system or process other than the augmented reality tool 10 itself. The pre-calibration increases in difficulty as the operating space becomes larger (for example in factory settings). If the calibrated features are moved, then the pre-calibration measurements have to be repeated.

Even if the calibration 56 and model 60 frames are different and their relative transformations are not initially known, the present invention can be used to add annotations to the scene 22. The present invention allows the augmented reality tool 10 to establish the transformation between different calibration 56 and model 60 frames using autocalibrated features.

Once sufficient features have been autocalibrated as described above, the transformation between the model 60 and calibration 56 frames can be computed. At a minimum, three features must have their coordinates known in both frames in order to establish the transformation. Some degenerate cases exist (e.g., collinear points) where more than three points are needed to calibrate the frames, but these occur rarely and can easily be tested for and rejected. All autocalibrated features have known 3D calibration frame coordinates. If three or more of the autocalibrated features also have known 3D coordinates in the model frame 60, the transformation between the model 60 and calibration 56 frames can be computed as shown at step 100 of FIG. 5. Mathematical tools are known to those skilled in the art and are available for performing this transformation (see for example Robert M. Haralick, "Review and Analysis of Solutions of the Three Point Perspective Pose Estimation Problem", with C.-N. Lee, K. Ottenberg, and M. Nolle, International Journal of Computer Vision Vol. 13, No. 3, 1994, p. 331–356; revised from "Analysis and Solutions of the Three Point Perspective Pose Estimation Problem", Proceedings of the IEEE Computer Society Conference on Computer Vision and Pattern Recognition, Lahaina, HI, Jun. 3–6, 1991, p. 592–583).

Bookcase corners 110, 112, 114, 116 can be autocalibrated by using the intentional fiducial 46 to define the calibration frame 56 as shown in FIG. 2. The calibrated features are then related to known model database 62 features using manual or automatic strategies as shown at 48a, b, c, d of FIG. 4. Autocalibrated feature 3D correspondences can be made manually (i.e. mouse clicks) by selecting autocalibrated features in a way that relates them to known model database coordinates. Autocalibrated feature 3D correspondences can be made automatically if recognizable features are defined in the model database 48.

If the model has recognizable or prominent natural features, for example the bookcase corners 110, 112, 114, 116, these can be marked as desirable features (DF) in the model database. During autocalibration the screen can prompt the user to autocalibrate these features. For example, text or a picture of the model highlighting the desirable features can prompt the user to autocalibrate features in that scene area. The placement of desirable features can also suggest good candidate placements of the calibrated features. The desirable features may not all be visible in any one image. For example, one can be to the left of, right of, and above the calibrated features. Separate camera motions may be needed to autocalibrate each desirable feature.

As a desirable feature is autocalibrated it may be automatically recognized by the augmented reality tool or manually corresponded to the 3D desirable feature. Either way, its correspondence to a 3D model frame coordinate of the model frame 60 becomes known. Screen prompts and user inputs can be used to verify or specify the correspondence.

Figure 4:
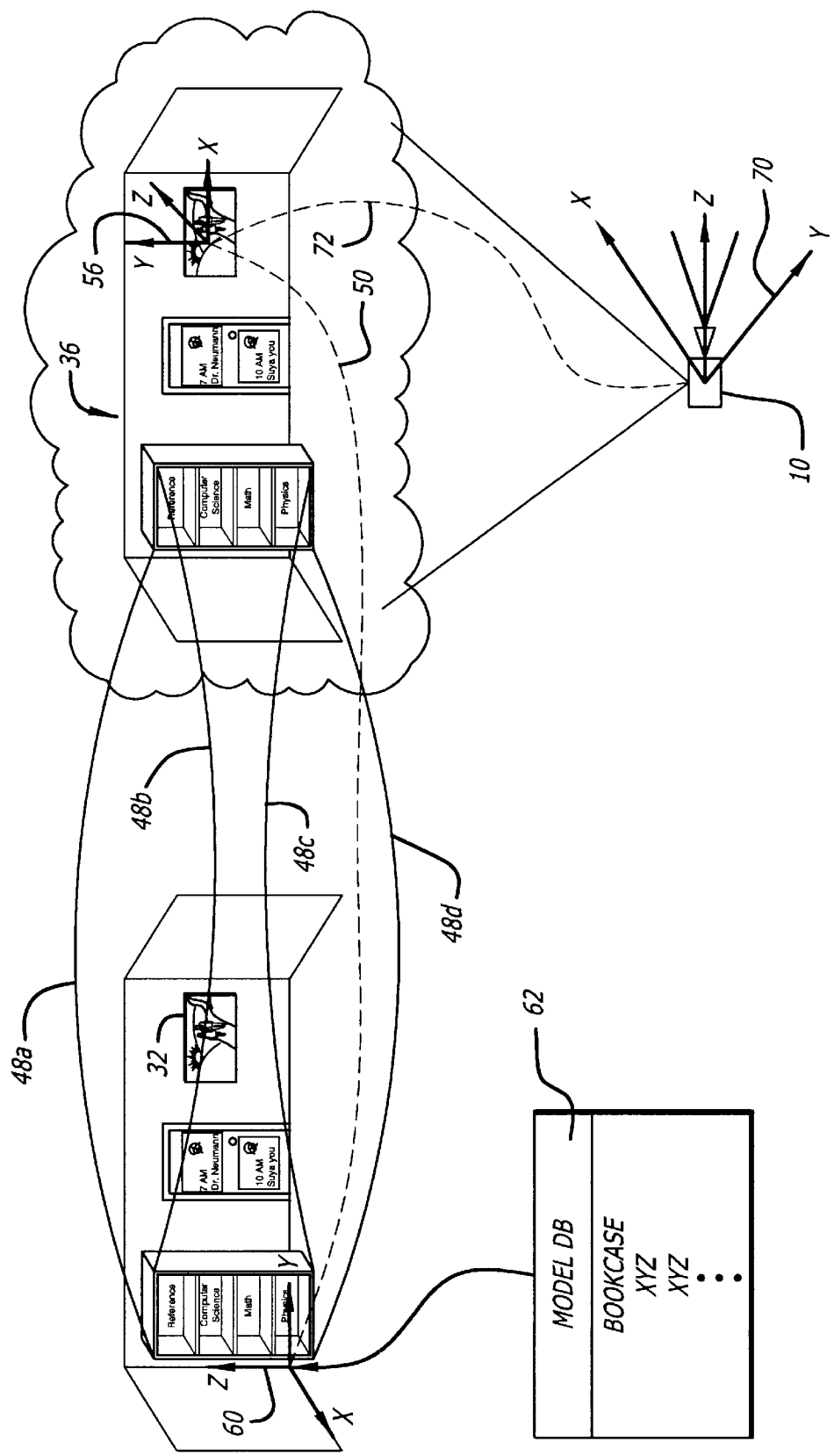
FIG. 4 shows features in the calibration database corresponded to features in the model database.

Once three desirable features are autocalibrated, the calibration frame 56 to model frame 60 transformation is computed by the augmented reality tool 10, again as illustrated in FIG. 4 and at step 100 of FIG. 5. If more than three desirable features are autocalibrated, the transformation is computed using average or minimum error methods.

The augmented reality tool 10 may also determine the positions of the annotations in the scene 22 on the fly based on incoming information rather than fixing the positions in advance. Further, this can be done by rendering the annotations into the scene 22 using autocalibrated features. For example, rather than including the origin of the virtual television 32 in the model database 62, the augmented reality tool 10 can be instructed to render the virtual television 32 into the scene 22 at a position to the right of autocalibrated points of the door 28 in current view. In this situation the model database 62 does not need to store the coordinates for the origin of the virtual television.

Returning to the office example of FIG. 1, consider the model database with the bookcase corners 110, 112, 114, 116 marked as desirable features. The augmented reality tool screen shows an image of the room wall highlighting the desirable features. The user places the calibration feature set, for example the intentional fiducial 46 on the wall near the bookcase 26. The augmented reality tool 10 recognizes the intentional fiducial 46 based on its unique texture regions and shape and matches known calibration frame 56 coordinates to the intentional fiducial's image coordinates. Autocalibration begins as soon as the augmented reality tool 10 computes its pose relative to the calibration frame 56. The tool may prompt the user to autocalibrate a particular desirable feature. The user moves the augmented reality tool 10 from the calibration feature set toward the desirable feature requested by the system. During autocalibration, the features are visible in the augmented reality tool screen 20. When the desirable feature becomes visible, the user identifies it through some input to the augmented reality tool 10, e.g., mouse selection and click. Once the desirable feature is autocalibrated, the system requests another desirable feature and the process is repeated. Once three desirable features are autocalibrated, the model frame to calibration frame transformation $X_{CM}$ (designated by the reference number 50 in FIG. 4) is determined from:

$$[XYZ]_{Calibration} = X_{CM} \begin{bmatrix} X \\ Y \\ Z \\ 1 \end{bmatrix}_{Model}$$

The fourth "1" element of the input (model) vector is the homogeneous coordinate for multiplying with the fourth column of the 3×4 matrix $X_{CM}$ given by:

$$X_{CM} = \begin{bmatrix} x_1 & x_2 & x_3 & x_4 \\ x_5 & x_6 & x_7 & x_8 \\ x_9 & x_{10} & x_{11} & x_{12} \end{bmatrix}.$$

The elements $x_1$, $x_2$, $x_3$, $x_5$, $x_6$, $x_7$, $x_9$, $x_{10}$, $x_{11}$ define rotation and the elements $x_4$, $x_8$, $x_{12}$ define translation. The model coordinates $[X\ Y\ Z\ 1]_{Model}$ are relative to the model coordinate frame 60 and the calibration coordinates $[X\ Y\ Z]_{Calibration}$ are relative to the calibration coordinate frame 56. The augmented reality tool 10 can inform the user that it can now display the annotations 32, 38, 40 and can render the annotations into the scene as illustrated at step 102 of FIG. 5.

If the model database has no desirable features marked, the user can select model database points and manually mark them as desirable features. Alternatively, the user can select prominent features that were successfully autocalibrated and mark their positions in a rendered 3D view of the model database 48. Any of these methods can establish the coordinates of at least three points in both the model 46 and calibration 44 frames. In all cases autocalibration is used to compute the calibration frame coordinates and this is a new use of that information.

FIG. 11 illustrates a semi-automatic method for rendering annotations into the scene 22. The camera 12 (see FIG. 1) acquires an image 136 of the scene 22 which is then displayed on the display 20. The camera pose is determined from pre-calibrated features such as the intentional fiducial 46 or autocalibrated features within the view of the image 136. The user selects point 140 in the image 136 corresponding to point 138 in the scene 22. Because the pose is known from the intentional fiducial 46, the 3D coordinates of the point 138 can be determined through autocalibration. The user then selects an annotation from the model database 62 or separate annotation database 64 to attach to the 3D point 138. If the autocalibration of the point 138 fails, or if the device does not use autocalibration, then the camera 12 can be moved to view the point 138 from a different angle and the user then selects the point 142 corresponding to the points 138 and 140. The point 138 can then be triangulated and the desired annotation attached to the images of the scene 22. This method can be used to autocalibrate arbitrary points, and is especially useful for calibrating points that are not easily recognizable and thus difficult to autocalibrate.

During autocalibration, loss of 2D tracking, 3D correspondences, and camera pose tracking are common due to rapid motions, camera occlusions, or poor imaging conditions. The present invention uses the autocalibrated features stored in calibration database 54 of FIG. 2, which here could also be the separate autocalibrated features database, for recovery of 2D tracking, 3D correspondences, and camera pose. The coordinates as well as recognizable attributes of the autocalibrated features are all stored in the calibration database 54. The autocalibrated features are stored in the calibration database 54 even after they are no longer visible to the camera 12. The calibrated features stored in the calibration database are reused once they return into the view of the camera 12. Camera pose is recovered by semi-automatic image matching or is automatically recovered if recognized autocalibrated features are in view. Also, gyroscope sensors can provide camera pose estimates that allow matching of detected features with autocalibrated features to recover camera pose. Other sensor data can be used to increase the reliability and accuracy of the recovered pose.

In some situations pose tracking is lost. A complete loss of tracking can occur due to major camera motion or occlusion. For example, an object might temporarily block the camera 12 or the lights might be turned on and off. If other tracking sensors are used, they might have failed as well. Only the 2D feature information of the scene viewed by the camera 12 is then available for recovering pose tracking. The present invention makes use of several methods for recovering camera pose tracking once lost.

Returning to FIG. 2, one method for recovering camera pose tracking is based on 2D recognition. The camera is positioned to view previously autocalibrated features, for example three of the bookcase corners 110, 112, 114, 116. The bookcase corners are recognized as autocalibrated features in the 2D camera view. 3D correspondences are then determined between the bookcase corners captured by the camera 12 and the bookcase corner coordinates stored in the calibration database 54. The approach is applicable regardless of the availability of pose since it only depends on recognizing the 2D attributes of features. Once three or more 2D features are recognized and corresponded to the stored set of autocalibrated features, pose is determined and normal augmented reality operation resumes.

Figure 6:
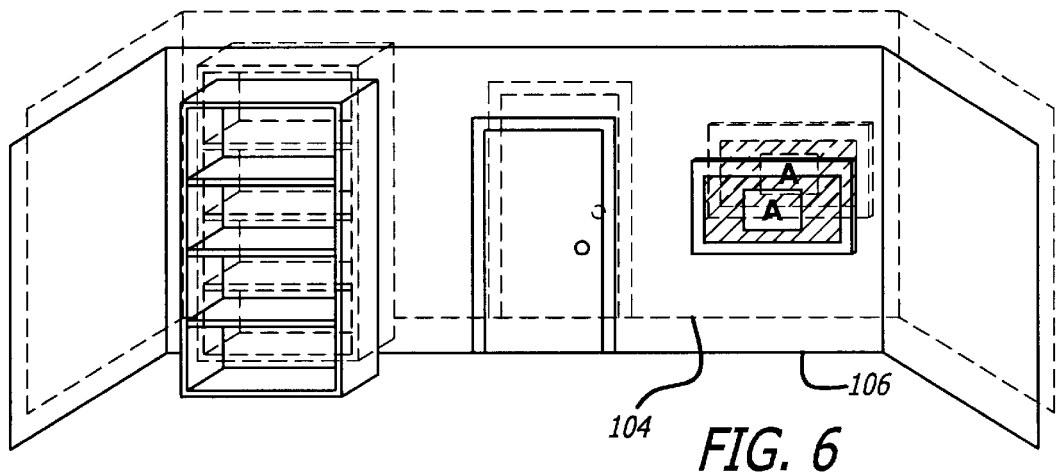
FIG. 6 shows a semi-automatic matching method for recovering camera pose tracking.

Another method for recovering camera pose tracking is based on interactive image matching, as illustrated in FIG. 6. A last (or any other) static frame 104 (where a frame is a captured image) of tracked pose, for example the image of the office scene 22, is displayed on the augmented reality tool display 20 with a prompt asking the user to match the new image to that one. The static frame 104 can be stored by a digital frame memory, for example. The static frame 104 is displayed transparently so that new camera images 106 are blended with it. Alternatively, the new camera images can be displayed transparently. The user manipulates the augmented reality tool camera to produce a match between the stored 104 and current 106 images. Once the features in both images are close, the system either automatically or by user input accepts the image match. Acceptance means that the current augmented reality tool pose is close to the pose of the static frame and correspondences are made between the autocalibrated features in the static frame 104 and nearby detected features in the new frames 106. Since only three correspondences are needed for pose tracking, only the 3 to 5 best-fitting features in the image are corresponded initially. Since these correspondences provide pose, in subsequent frames other features can be corresponded using methods suited for when pose is available. The augmented reality tool display 20 can facilitate this image matching process by highlighting the most detectable and accurately positioned autocalibrated feature in the static image 104 for matching. The matching process can also be displayed on the augmented reality tool display 20 as the number of matching features found or a weighted score, where matches are weighted by how closely they fall in the image.

In all methods of pose recovery, the pose can first be estimated using gyroscopes, GPS, or ultrasonic sensor systems for example. The pose can also be estimated using manual correspondence methods. If initial rough estimates of the pose are first provided, then automatic pose recovery is easier.

In situations where the camera pose tracking is maintained but some 2D tracking and 3D correspondences have been lost for previously autocalibrated features, other methods can be used to regain the lost tracking and correspondences. These same methods can also be used after the camera pose tracking has been lost and then recovered using one of the methods described above. Loss of 2D tracking and 3D correspondences occur if an autocalibrated feature moves out of view of the camera 12. For example, if a bookcase corner is autocalibrated and then moves out of view of the camera 12, it is no longer tracked in the image and its 3D correspondence is lost. In the present invention, as the camera loses sight of the an autocalibrated feature, the recognizable characteristics and coordinates of the feature are maintained in the augmented reality tool memory in the calibration database 52 for future use. Pose tracking is maintained by creating new autocalibrated features or by reusing existing ones. Other sensors can also be used to compute or at least estimate pose, including gyroscopes, GPS, or ultrasonic sensor systems. Regardless of how pose tracking is maintained, when the camera view returns to the same area, 2D features are detected and the bookcase corners may or may not be among those detected. The detection process alone has no direct way of knowing which, if any, of the 2D features corresponds to any of the stored autocalibrated features. The invention provides several methods for corresponding detected features with stored autocalibrated features.

A first method is based on recognizable characteristics, such as color, shape, or texture associated with the 2D features, for example the bookcase corners 112, 114, 116, 118, or any other autocalibrated features stored in the calibration database 54. Feature attributes are recognized and compared to data stored with autocalibrated features. This method uses the techniques described for calibrating the scene 22 by corresponding pre-calibrated features in the calibration frame to features detected in the camera image. The difference is that stored autocalibrated features are used to make the correspondences rather than using pre-calibrated features.

Figure 7:
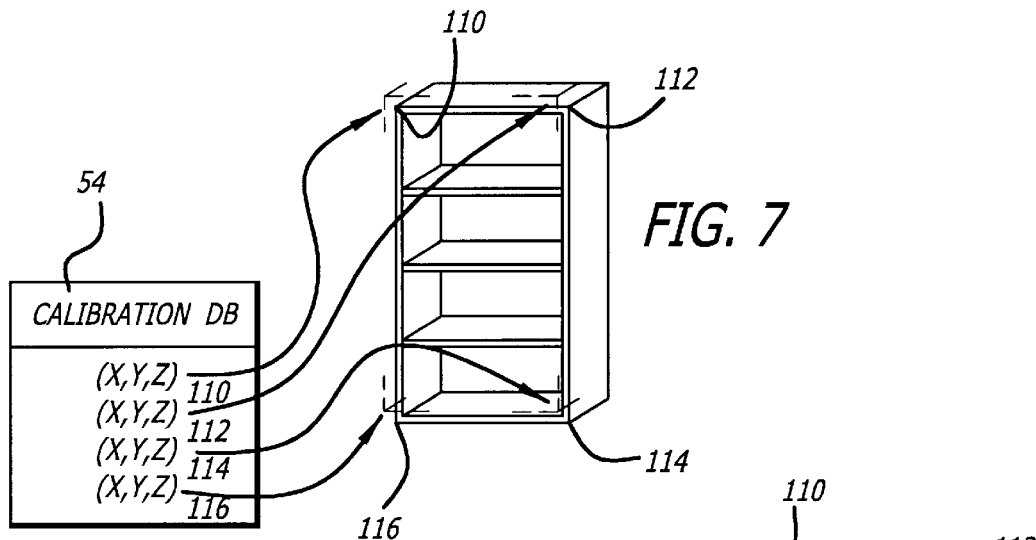
FIG. 7 shows a projected proximity method for recovering 2D tracking and 3D correspondences which have been lost.

A second method is based on projected proximity as illustrated in FIG. 7. Since camera pose is known from other features whose correspondences are known, the set of autocalibrated features can be projected onto the image and any that fall within a small distance of the detected feature can be corresponded. In practice, a number of frames are tested to verify that the projected autocalibrated feature reliably falls close to the detected feature before the correspondence is accepted and used. FIG. 7 shows autocalibrated corners of the bookcase 26 stored in the calibration database 54 projected into the image of the bookcase 26. The autocalibrated features can be determined to correspond to the bookcase corners 110, 112, 114, 116 in the image since their projections into the image fall within a small distance of the corners detected in the image and this correspondence can be verified by continuing to project the autocalibrated features into the image over several frames.

Figure 8:
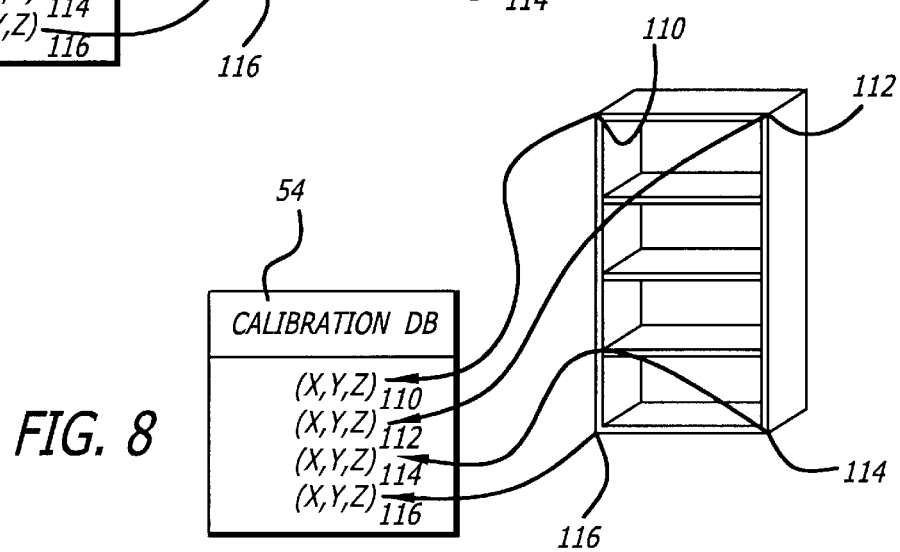
FIG. 8 shows a 3D proximity method for recovering 2D tracking and 3D correspondences which have been lost.

A third method is based on 3D proximity as illustrated in FIG. 8. All new features, for example the bookcase corners 110, 112, 114, 116 are autocalibrated as they are seen. As an initial estimate of their 3D location is produced, it is compared to the autocalibrated feature positions stored in the calibration database 54. If a stored autocalibrated feature is found close to the new feature estimate, the stored autocalibrated feature position is used to update the autocalibration estimate of the new feature position. Autocalibration is continued for a few frames to verify that the new feature position remains close to the corresponding stored autocalibrated feature position before the correspondence is accepted and used.

Figure 9:
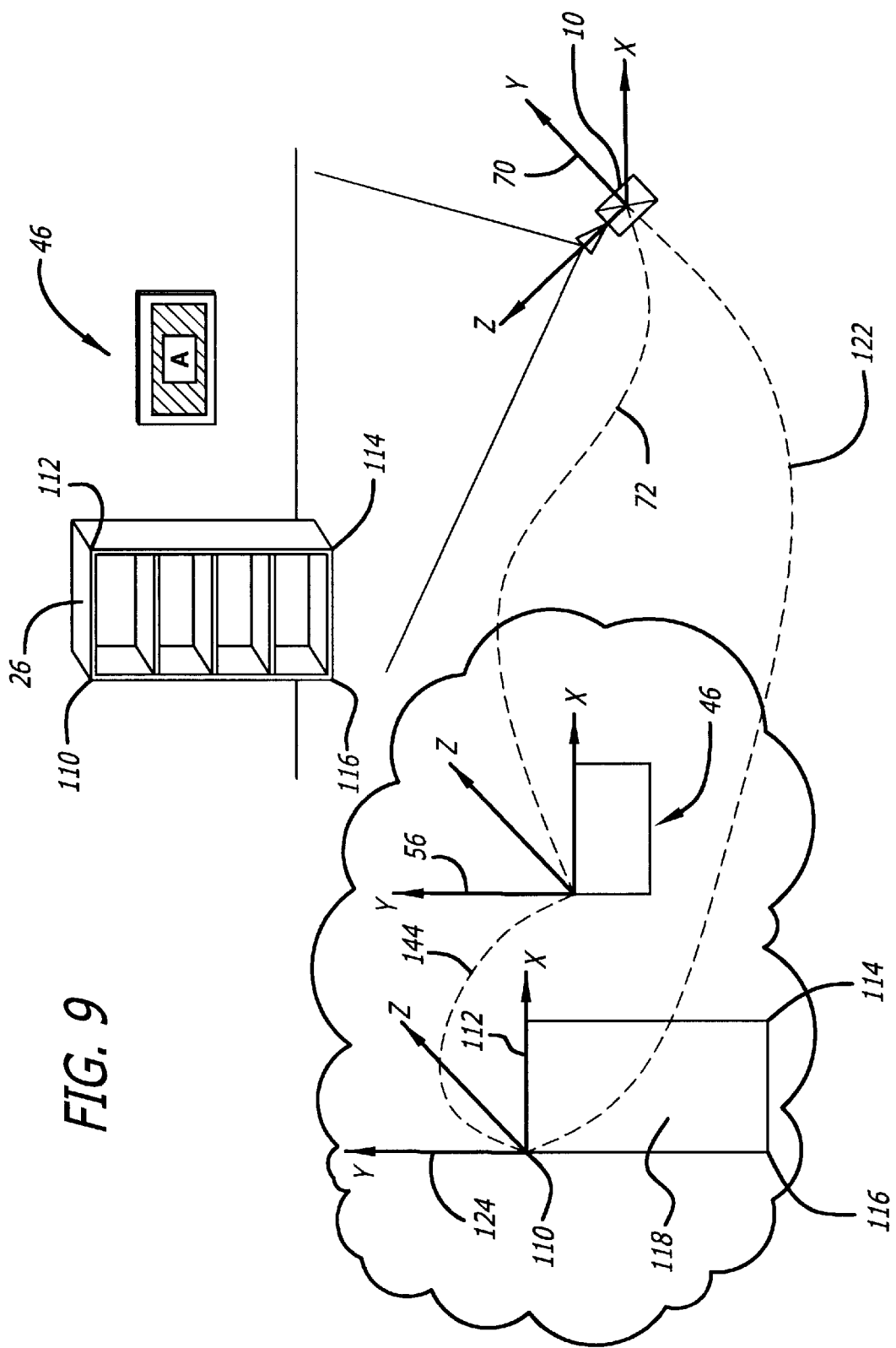
FIG. 9 shows an method for autocalibrating clusters of features or shape features as a group.

FIGS. 9 and 10 illustrate a method used by the present invention for autocalibrating clusters of features or shape features which can be, for example, the corners 110, 112, 114, 116 of the bookcase 26 forming the cluster 118. Using normal autocalibration, each of the four corners is detected and processed as a point feature, and autocalibration computes a 3D position for each corner. However, these corner positions may have errors so the four coordinates may not fit the rectangular shape of the bookcase 26. These autocalibration errors cause pose and annotation alignment errors when the augmented reality tool 10 subsequently views the bookcase 26. The present invention includes a method for autocalibrating the entire shape feature to preserve the relationships of its points. A single transform is computed to position and orient all the points in the shape feature. The shape feature is calibrated with lower computation cost. The augmented reality tool 10 computes two poses, one relative to the features in the calibration frame 56 and the other relative to a shape feature coordinate frame 124. The method computes the difference between the true camera pose and the camera pose computed by using the shape feature as a calibrated feature set. At least three features, whose coordinates are known in the calibration frame, and another 3 features, whose coordinates are known in the shape feature or cluster coordinate frame 124, should be visible. The observed features should have their 3D correspondences known within their respective coordinate frames. This single rigid transformation is applied to each feature point in the shape feature to autocalibrate it. The model coordinate frame 60 of FIG. 4 can also be calibrated to the calibration frame 56 using this method.

In one example of the present embodiment, the camera 12 is positioned to acquire an image 120 of a calibrated feature set, such as the intentional fiducial 46 as shown at step 126 of FIG. 10. From the intentional fiducial 46 the camera pose matrix $X_P$, designated by reference number 72, is determined as shown at step 128 of FIG. 10. As described above, the camera pose matrix 72 transforms coordinates from the camera coordinate frame 70 to the calibration coordinate frame 56.

Once the camera pose is determined relative to the intentional fiducial 46, the camera pose is then computed relative to the cluster 118 as shown at step 130 of FIG. 10. The cluster pose matrix $X_{CL}$, designated by reference number 122, represents the pose of the camera relative to the cluster 118 in the cluster coordinate frame 124. From the matrices $X_P$ and $X_{CL}$ a transformation matrix $X_{CLC}$ 144 can be determined as shown at step 132 of FIG. 10. The matrix $X_{CLC}$ represents the transform from the cluster frame 124 to the calibration frame 56. The matrix $X_{CLC}$ is calculated from:

$$X_{CLC} = X_P X_{CL}^{-1}$$

As shown at step 134 of FIG. 10, the cluster 118 can then be autocalibrated by using the transformation matrix $X_{CLC}$ to transform each point of the cluster 118 from the cluster coordinate frame 124 to the calibration coordinate frame 56 as follows:

$$[XYZ]_{calibration} = X_{CLC} \begin{bmatrix} X \\ Y \\ Z \\ 1 \end{bmatrix}_{cluster}$$

where the fourth "1" element of the input (cluster) vector is the homogeneous coordinate for multiplying with the fourth column of the 3×4 matrix $X_{CLC}$.

Once the cluster 118 is autocalibrated, its recognizable characteristics and 3D coordinates can be stored in the calibration database 54 or autocalibration database for use as described above.

It is to be understood that other embodiments may be utilized and structural and functional changes may be made without departing from the scope of the present invention. The foregoing descriptions of embodiments of the invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

We claim:

1. A method for producing an augmented image by combining a computer-generated virtual-image with a real-world view of a real scene captured by an imaging device, comprising the steps of:

capturing a view of the real scene with the imaging device;

detecting features in the view corresponding to calibration features in a calibration database containing 3-dimensional coordinates of the calibration features relative to a calibration coordinate frame;

corresponding the detected features to the calibration features to provide the 3-dimensional coordinates of the detected features;

determining a pose of the imaging means from the corresponded features;

changing the pose of the imaging device to a different pose and capturing a different view of the real scene wherein the different view contains at least some of the corresponded features;

detecting additional features in the different view of the real scene;

calibrating the additional features using the positions of at least some of the corresponded features within the different view to produce a set of autocalibrated features;

determining correspondences between at least some of the set of autocalibrated features and features in a model database containing 3-dimensional coordinates of the computer-generated virtual-image relative to a model coordinate frame different from the calibration coordinate frame;

determining a transformation between the calibration coordinate frame and the model coordinate frame based on the correspondences between the autocalibrated features and the model database features; and combining the computer-generated virtual-image with the different view of the real scene in an output device by using the transformation between the calibration coordinate frame and the model coordinate frame and the determined different pose.

2. The method of claim 1, further comprising the steps of:

changing the pose of the imaging device to an additional different pose and capturing an additional different view of the real scene containing at least some of the set of autocalibrated features;

determining the additional different pose of the imaging device using the positions of at least some of the set of autocalibrated features within the additional different view; and combining the computer-generated virtual-image with the additional different view of the real scene in an output device by using the transformation between the calibration coordinate frame and the model coordinate frame and the determined additional different pose.

3. The method of claim 1, wherein at least three features having their 3-dimensional coordinates known in both the calibration frame and the model frame are corresponded.

4. The method of claim 1, wherein the correspondences between at least some of the set of autocalibrated features and the features in the model database are determined by interactively selecting the autocalibrated and model database features.

5. The method of claim 4, wherein a user is prompted to interactively select certain points.

6. The method of claim 3, wherein the three features are selected according to characteristics selected from the group comprising color, shape and texture.

7. The method of claim 3, wherein at least one of the features is a corner of an object.

8. The method of claim 1, further comprising the step of tracking in 2-dimensions at least some of the detected features and additional features as the camera pose changes to the different pose.

9. The method of claim 1, wherein the computer-generated virtual-image is combined with the different view of the real scene in the output device by using the equation:

$$[XYZ]_{Calibration} = X_{CM} \begin{bmatrix} X \\ Y \\ Z \\ 1 \end{bmatrix}_{Model}$$

where $[X\ Y\ Z1]_{Model}$ represents the model coordinates of the computer-generated virtual-image relative to the model coordinate frame, $[X\ Y\ Z]_{Calibration}$ represents the coordinates of the computer-generated virtual-image relative to the calibration coordinate frame, and $X_{CM}$ represents the transformation between the calibration coordinate frame and the model coordinate frame given by:

$$X_{CM} = \begin{bmatrix} x_1 & x_2 & x_3 & x_4 \\ x_5 & x_6 & x_7 & x_8 \\ x_9 & x_{10} & x_{11} & x_{12} \end{bmatrix}$$

where the elements $x_1, x_2, x_3, x_5, x_6, x_7, x_9, x_{10}, x_{11}$ define rotation and the elements $x_4, x_8, x_{12}$ define translation.

10. An imaging tool for producing an augmented image by combining at least one computer-generated virtual-image with a real-world view of a real scene captured by an imaging means, comprising:

a processor;

a data storage means;

a means for transferring data between the storage device and the processor;

an imaging device for capturing views of the real scene;

a means for changing the pose of the imaging device;

a calibration database stored by the data storage means and containing 3-dimensional coordinates relative to a calibration coordinate frame of calibration features corresponding to features detected in views of the real scene;

a set of calibrated features having known 3-dimensional coordinates relative to the calibration coordinate frame obtained by corresponding features in the views of the real scene with the calibration features;

a set of autocalibrated features having known 3-dimensional coordinates relative to the calibration coordinate frame obtained from a view containing at least some of the set of calibrated features and from the pose of the imaging device determined from at least some of the set of calibrated features;

a model database stored by the data storage means and containing 3-dimensional coordinates of the computer-generated virtual-images and of at least some of the autocalibrated features relative to a model coordinate frame so that the processor determines a transformation between the calibration coordinate frame and the model coordinate frame;

a display for combining at least some of the set of computer-generated virtual-images with a real-world view of a real scene based on a determination by the processor of the pose of the imaging device and based upon the transformation by the processor to match the model and calibration coordinate frames.

11. The imaging tool of claim 10, wherein the transformation between the calibration coordinate frame and the model frame is given by:

$$X_{CM} = \begin{bmatrix} x_1 & x_2 & x_3 & x_4 \\ x_5 & x_6 & x_7 & x_8 \\ x_9 & x_{10} & x_{11} & x_{12} \end{bmatrix}$$

where the elements $x_1, x_2, x_3, x_5, x_6, x_7, x_9, x_{10}, x_{11}$ define rotation and the elements $x_4, x_8, x_{12}$ define translation; and the computer-generated virtual-image is transformed from the model coordinate frame to the calibration coordinate frame using the equation:

$$[XYZ]_{Calibration} = X_{CM} \begin{bmatrix} X \\ Y \\ Z \\ 1 \end{bmatrix}_{Model}$$

where $[X\ Y\ Z1]_{Model}$ represents the model coordinates of the computer-generated virtual-image relative to the model coordinate frame, and $[X\ Y\ Z]_{Calibration}$ represents the coordinates of the computer-generated virtual-image relative to the calibration coordinate frame.

12. The imaging tool of claim 10, wherein the transformation between the calibration coordinate frame and the model coordinate frame is determined by corresponding at least three autocalibrated features having their 3-dimmensional coordinates known in both the calibration frame and the model frame.

13. The imaging tool of claim 10, wherein the processor determines the transformation between the calibration coordinate frame and the model coordinate frame by interactively corresponding features having their 3-dimensional coordinates known in both the calibration frame and the model frame.

14. The imaging tool of claim 13, wherein a user is prompted to interactively select certain points to correspond the features.

15. The imaging tool of claim 12, wherein the three features are selected according to characteristics selected from the group comprising color, shape and texture.

16. The imaging tool of claim 12, wherein at least one of the features is a corner of an object.

17. The imaging tool of claim 10, wherein the processor tracks at least some of the set of autocalibrated features in 2-dimensions as the camera pose changes.

18. The imaging tool of claim 10, wherein the calibration database and autocalibration database are stored together in a single file and the data storage means consists of a single memory storage device.

19. The imaging tool of claim 10, wherein the calibration database, autocalibration database and model database are stored together in the data storage means, the data storage means comprised of several separate memory storage devices.

20. A method for producing an augmented image by combining a computer-generated virtual-image with a real-world view of a real scene captured by an imaging device, comprising the steps of:
capturing a view of the real scene with the imaging device;
detecting features in the view corresponding to calibration features in a calibration database containing 3-dimensional coordinates of the calibration features relative to a calibration coordinate frame;
corresponding the detected features to the calibration features to provide the 3-dimensional coordinates of the detected features;
determining the pose of the imaging means from the corresponded features;
changing the pose of the imaging device to a different pose and capturing a different view of the real scene wherein the different view contains at least some of the corresponded features;
detecting additional features in the different view of the real scene;
calibrating the additional features using the positions of at least some of the corresponded features within the different view to produce autocalibrated features;
storing the autocalibrated features;
losing tracking of the stored autocalibrated features;
recovering tracking of the stored autocalibrated features by corresponding detected features to the stored autocalibrated features; and
combining the computer-generated virtual-image with the different view of the real scene in an output device using the stored autocalibrated features.

21. The method of claim 20, wherein the stored autocalibrated features are part of a larger set of stored autocalibrated features.

22. The method of claim 20, further comprising the steps of:
changing the pose of the imaging device to an additional different pose and capturing an additional different view of the real scene containing the stored autocalibrated features;
determining the additional different pose of the imaging device using the stored autocalibrated features within the additional different view; and
combining the computer-generated virtual-image with the additional different view of the real scene in an output device using the stored autocalibrated features.

23. The method of claim 20, wherein at least three of the detected features are corresponded to three of the stored autocalibrated features.

24. The method of claim 20, wherein a detected feature is corresponded to a stored autocalibrated feature to recover lost feature tracking by:
projecting a stored autocalibrated feature onto another view of the real scene;
determining whether the autocalibrated feature falls within a determined distance of the detected feature; and
corresponding the detected feature to the autocalibrated feature when it is determined that the autocalibrated feature falls within the determined distance of the detected feature.

25. The method of claim 20, wherein at least one detected feature is corresponded to a stored autocalibrated feature by:
estimating a position of the detected feature using autocalibration;
comparing the estimated position to a position of a stored autocalibrated feature having similar characteristics;
corresponding the detected feature to the stored autocalibrated feature when the positions fall within a determined distance to each other; and
updating the estimated position with the position of the stored autocalibrated feature when a correspondence is determined.

26. The method of claim 20, further comprising the step of recovering a lost pose of the imaging device.

27. The method of claim 26, wherein the lost pose is recovered by corresponding at least three detected features to the stored autocalibrated features.

28. The method of claim 26, wherein the lost pose is recovered by interactively matching a previous frame with a later frame.

29. The method of claim 28, wherein the previous and later frames are displayed so that they are blended together with one transparent relative to the other.

30. The method of claim 26, wherein the lost pose of the imaging device is determined at least in part using a gyroscope, a global positioning system (GPS) sensor or an ultrasonic sensor.

31. The method of claim 20, further comprising the step of tracking in 2-dimensions at least some of the detected features and additional features as the camera pose changes to the different pose.

32. An imaging tool for producing an augmented image by combining at least some of a set of computer-generated virtual-images with a real-world view of a real scene captured by an imaging means, comprising:
a processor;
a data storage means;
a means for transferring data between the storage device and the processor;
an imaging device for capturing views of the real scene;
a means for changing the pose of the imaging device;
a calibration database stored by the data storage means and containing 3-dimensional coordinates relative to a calibration coordinate frame of calibration features corresponding to features detected in views of the real scene;
a set of calibrated features having known 3-dimensional coordinates relative to the calibration coordinate frame obtained by corresponding features in the views of the real scene with the calibration features;
autocalibrated features having known 3-dimensional coordinates relative to the calibration coordinate frame obtained from a view containing at least some of the set of calibrated features and from the pose of the imaging device determined from at least some of the set of calibrated features; an autocalibration database storing the autocalibrated features and, in cooperation with the processor, corresponding detected features captured by the imaging device to the autocalibrated features in the autocalibration database to recover lost autocalibrated feature tracking;

a model database stored by the data storage means and containing 3-dimensional coordinates of a set of computer-generated virtual-images; and a display for combining at least some of the set of computer-generated virtual-images with a real-world view of a real scene based, based at least in part, on a determination by the processor of the pose of the imaging device.

33. The imaging tool of claim 32, wherein the stored autocalibrated features are part of a larger set of stored autocalibrated features.

34. The imaging tool of claim 32, wherein at least three of the detected features are corresponded to three of the autocalibrated features to recover lost autocalibrated feature tracking.

35. The imaging tool of claim 32, wherein the processor corresponds a detected feature to a stored autocalibrated feature by:

projecting a stored autocalibrated feature onto another view of the real scene;

determining whether the autocalibrated feature falls within a determined distance of detected feature; and corresponding the detected feature to the autocalibrated feature when it is determined that the autocalibrated feature falls within the determined distance of the detected feature.

36. The imaging tool of claim 32, wherein the processor corresponds a detected feature to a stored autocalibrated feature by:

estimating a position of the detected feature;

comparing the estimated position to a position of a stored autocalibrated feature;

corresponding the detected feature to the stored autocalibrated feature when the positions fall within a determined distance to each other;

updating the estimated position with the position of the stored autocalibrated feature when a correspondence is determined.

37. The imaging tool of claim 32, wherein a lost pose of the imaging device is recovered.

38. The imaging tool of claim 37, wherein the lost pose is recovered by corresponding at least three detected features to at least three of the stored autocalibrated features.

39. The imaging tool of claim 37, wherein the lost pose is recovered by interactively matching a previous frame with a later frame.

40. The imaging tool of claim 39, wherein the previous and later frames are displayed so that they are blended together with one transparent relative to the other.

41. The imaging tool of claim 37, further comprising a gyroscope, a global positioning system (GPS) sensor or an ultrasonic sensor for determining the lost pose of the imaging device.

42. The imaging tool of claim 32, wherein the calibration database and autocalibration database are stored together in a single storage device.

43. A method for producing an augmented image by combining a computer-generated virtual-image with a real-world view of a real scene captured by an imaging device, comprising the steps of:

capturing a view of the real scene with the imaging device;

detecting features in the view corresponding to calibration features in a calibration database containing 3-dimensional coordinates of the calibration features relative to a calibration coordinate frame;

corresponding the detected features to the calibration features to provide the 3-dimensional coordinates of the detected features;

determining a true pose of the imaging means relative to the calibration coordinate frame from the corresponded features;

detecting a shape feature in the view corresponding to a calibration shape feature element in a shape feature database containing 3-dimensional coordinates of the shape feature relative to a shape feature coordinate frame;

corresponding the shape feature to the calibration shape feature element to provide the 3-dimensional coordinates of the detected shape feature;

determining a second pose of the imaging means relative to the shape feature coordinate frame using the corresponded shape feature coordinates;

determining the difference between the true and second poses to determine a transformation between the calibration and shape feature coordinate frames;

autocalibrating the second shape feature using the transformation; and combining the computer-generated virtual-image with the view of the real scene in an output device based on a view of the shape feature.

44. The method of claim 43, wherein the step of combining the computer-generated virtual-image with the view of the real scene in an output device based on a view of the shape feature also includes:

determining correspondences between the autocalibrated shape feature and features in a model database containing 3-dimensional coordinates of the computer-generated virtual-image relative to a model coordinate frame different from the calibration coordinate frame;

determining a transformation between the calibration coordinate frame and the model coordinate frame based on the correspondences between the autocalibrated shape feature and the model database features; and combining the computer-generated virtual-image with the view of the real scene in the output device using the transformation.

45. The method of claim 44, further comprising the step of storing the autocalibrated shape feature.

46. The method of claim 45, further comprising the step of recovering lost feature tracking by corresponding detected features to the stored autocalibrated shape feature.

47. The method of claim 43, wherein the shape feature is autocalibrated using the equation:

$$[XYZ]_{calibration} = X_{CLC} \begin{bmatrix} X \\ Y \\ Z \\ 1 \end{bmatrix}_{cluster}$$

where $[X\ Y\ Z1]_{cluster}$ represents the shape feature coordinates relative to the shape feature coordinate frame, $[X\ Y\ Z]_{calibration}$ represents the shape feature coordinates transformed into the calibration coordinate frame, and the matrix $X_{CLC}$ represents the transform from the shape feature coordinate frame to the calibration coordinate frame and is determined from $$X_{CLC} = X_P X_{CL}^{-1}$$

where $X_{CL}$ represents the pose of the imaging device relative to the shape feature in the shape feature coordinate frame and $X_P$ represents the pose of the imaging device relative to the calibration coordinate frame.

48. An imaging tool for producing an augmented image by combining at least one computer-generated virtual-image with a real-world view of a real scene captured by an imaging means, comprising:
   a processor;
   a data storage means;
   a means for transferring data between the storage device and the processor;
   an imaging device for capturing views of the real scene;
   a means for changing the pose of the imaging device;
   a calibration database stored by the data storage means and containing 3-dimensional coordinates relative to a calibration coordinate frame of calibration features corresponding to features detected in views of the real scene;
   calibrated features having known 3-dimensional coordinates relative to the calibration coordinate frame obtained by corresponding features in the views of the real scene with the calibration features;
   a shape feature database stored by the data storage means and containing 3-dimensional coordinates relative to a shape feature coordinate frame of at least one shape feature detected in views of the real scene;
   at least one autocalibrated shape feature determined by autocalibrating the shape feature, the autocalibrating performed by determining a transformation between a true pose of the imaging device calculated from the calibrated features relative to the calibration coordinate frame and a pose of the imaging device calculated from the shape feature relative to the shape feature coordinate frame;
   a model database stored by the data storage means and containing 3-dimensional coordinates of the computer-generated virtual-image; and
   a display for combining the computer-generated virtual-image with a real-world view of a real scene based, at least in part, on a determination by the computer processor of the pose of the imaging device based on an image of autocalibrated shape feature.

49. The imaging tool of claim 48, wherein the shape feature is autocalibrated using the equation:

$$[XYZ]_{calibration} = X_{CLC} \begin{bmatrix} X \\ Y \\ Z \\ 1 \end{bmatrix}_{cluster}$$

where $[X\,Y\,Z1]_{cluster}$ represents shape feature coordinates relative to the shape feature coordinate frame, $[X\,Y\,Z]_{calibration}$ represents the shape feature coordinates transformed into the calibration coordinate frame, and the matrix $X_{CLC}$ represents the transform from the shape feature coordinate frame to the calibration coordinate frame and is determined from $$X_{CLC} = X_P X_{CL}^{-1}$$

where $X_{CL}$ represents the pose of the imaging device relative to the shape feature in the shape feature coordinate frame and $X_P$ represents the pose of the imaging device relative to the calibration coordinate frame.

50. The imaging tool of claim 48, wherein:
   the model database also contains the coordinates of the autocalibrated shape feature relative to a model coordinate frame so that the processor determines a transformation between the calibration coordinate frame and the model coordinate frame for combining the computer-generated virtual-image with the view of the real scene.

51. The imaging tool of claim 48, further comprising an autocalibration database storing the set of autocalibrated shape features and, in cooperation with the processor, corresponding detected features captured by the imaging device to the autocalibrated shape feature in the autocalibration database to recover lost feature tracking.

52. A method for producing an augmented image by combining a computer-generated virtual-image with a real-world view of a real scene captured by an imaging device, comprising the steps of:
   capturing a view of the real scene with the imaging device;
   detecting features in the view corresponding to calibration features in a calibration database containing 3-dimensional coordinates of the calibration features relative to a calibration coordinate frame;
   corresponding the detected features to the calibration features to provide the 3-dimensional coordinates of the detected features;
   determining the pose of the imaging means from the corresponded features;
   selecting a scene attachment point in the view for autocalibration;
   changing the pose of the imaging device to a different pose and capturing a different view of the real scene wherein the different view contains the scene attachment point;
   selecting the same scene attachment point in the different view; calibrating the 3D coordinates of the scene attachment point by triangulating the same selected scene attachment point positions of the view and different view; and
   attaching the computer-generated virtual-image at the 3D coordinates of the calibrated scene attachment point for display by the imaging device.

* * * * *